United States Patent
Ajan

(10) Patent No.: US 11,071,899 B1
(45) Date of Patent: Jul. 27, 2021

(54) ATTACHMENT SYSTEM FOR A TRAINING RIG

(71) Applicant: Eleiko Group AB, Halmstad (SE)

(72) Inventor: Nermin Ajan, Halmstad (SE)

(73) Assignee: ELEIKO GROUP AB, Halmstad (SE)

( * ) Notice: Subject to any disclaimer, the term of this patent is extended or adjusted under 35 U.S.C. 154(b) by 0 days.

(21) Appl. No.: 16/897,192

(22) Filed: Jun. 9, 2020

(51) Int. Cl.
 *A63B 71/02* (2006.01)
 *F16M 13/02* (2006.01)

(52) U.S. Cl.
 CPC .......... *A63B 71/023* (2013.01); *F16M 13/02* (2013.01); *F16M 13/025* (2013.01)

(58) Field of Classification Search
 CPC ..... A63B 71/023; F16M 13/025; F16M 13/02
 USPC .................... 482/130, 38; 248/201
 See application file for complete search history.

(56) References Cited

U.S. PATENT DOCUMENTS

| | | | | |
|---|---|---|---|---|
| 8,226,074 B1 * | 7/2012 | Hughey | ................ | B25B 5/006 269/155 |
| 9,079,636 B1 * | 7/2015 | Arnall | ................ | B25B 5/006 |
| 10,940,380 B2 * | 3/2021 | Beaver | ................ | A63B 17/00 |
| 2015/0059257 A1 * | 3/2015 | Beaver | ............... | A63B 23/0458 52/27 |
| 2016/0175653 A1 | 6/2016 | Beaver | | |
| 2017/0032714 A1 * | 2/2017 | Barnard, IV | ......... | G09F 19/226 |
| 2018/0028852 A1 * | 2/2018 | Beaver | ................ | A63B 21/078 |
| 2019/0168092 A1 * | 6/2019 | Beaver | ................. | G09B 9/003 |
| 2020/0230458 A1 * | 7/2020 | Dery | ............... | A63B 21/00047 |
| 2021/0002892 A1 * | 1/2021 | Putnam | ................. | E04G 21/24 |

* cited by examiner

*Primary Examiner* — Muhammad Ijaz
(74) *Attorney, Agent, or Firm* — Tucker Ellis LLP

(57) ABSTRACT

A first and second attachment system for attachment of a training rig to an upper edge of an ISO shipping container. Both systems include inside corner brackets that fit inside corner fittings of the container. The first attachment system further includes first attachment means with outside corner brackets which are to be attached to the inside corner brackets, second attachment means for attachment to a frame of the container and longitudinal beams for arrangement between the first and second attachment means or two second attachment means. The second attachment system includes a beam with vertical end plates and two outside corner brackets, wherein the end plates and the two outside corner brackets are to be attached to the inside corner brackets. These systems are attachable to any standard ISO shipping container and do not affect the container at all which means that no specially designed container must be used.

22 Claims, 6 Drawing Sheets

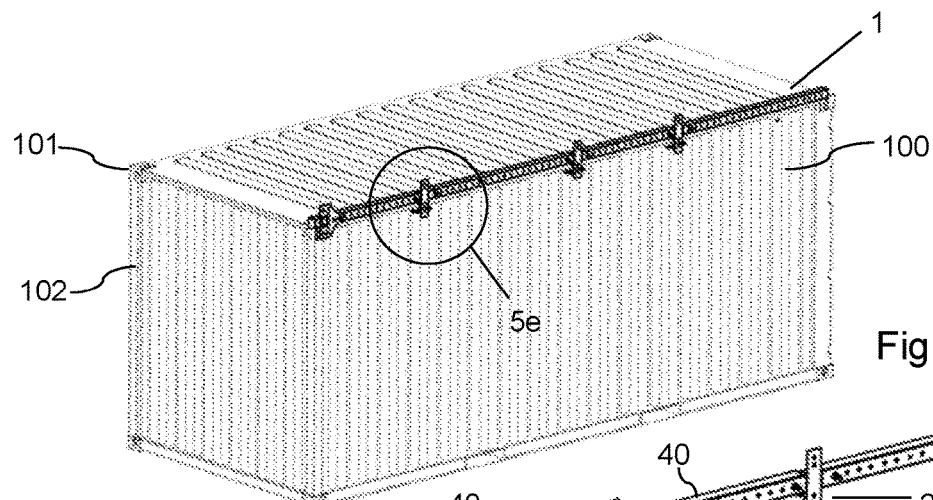
Fig. 5A
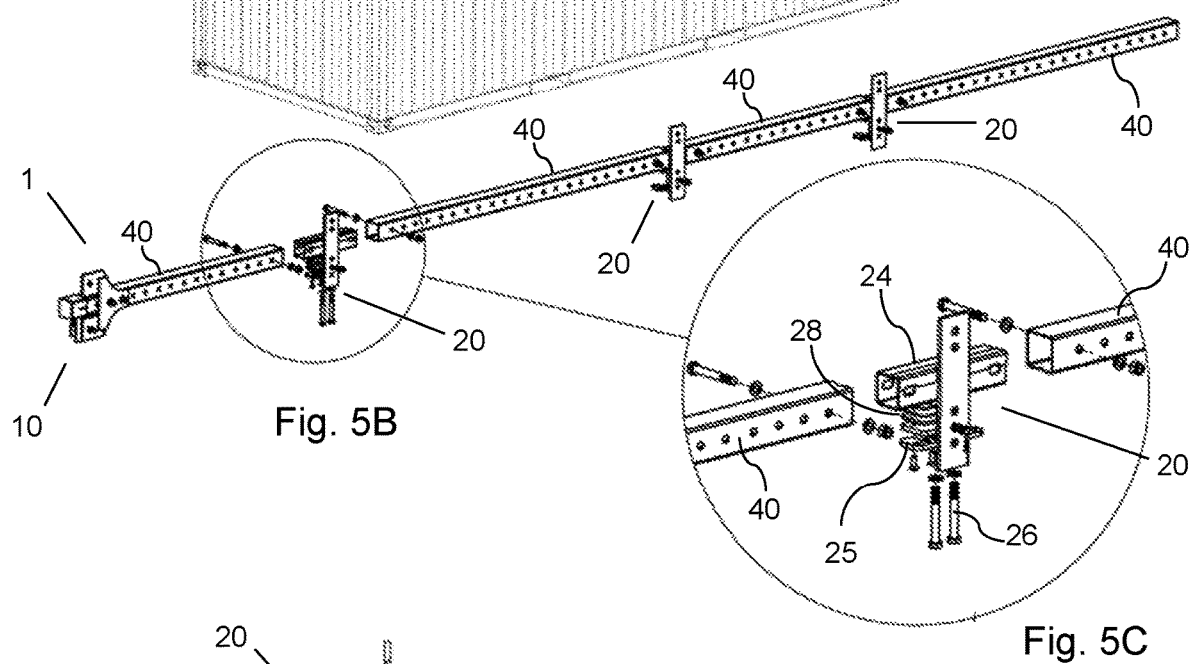
Fig. 5B
Fig. 5C
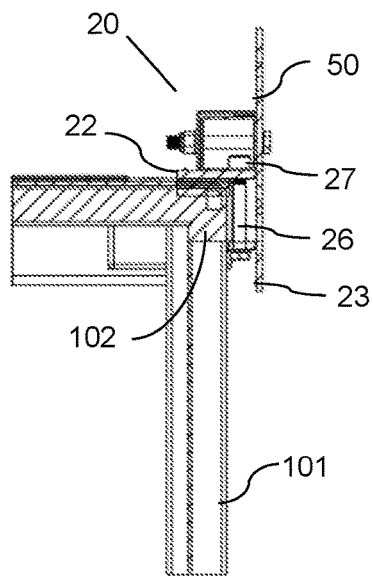
Fig. 5D
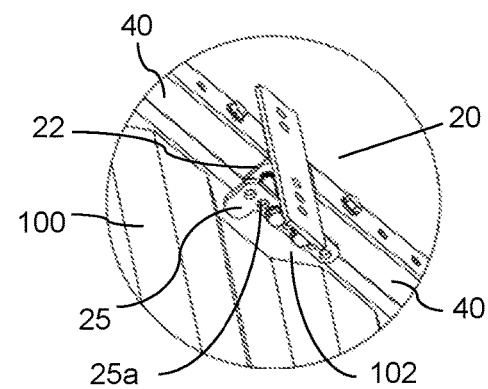
Fig. 5E

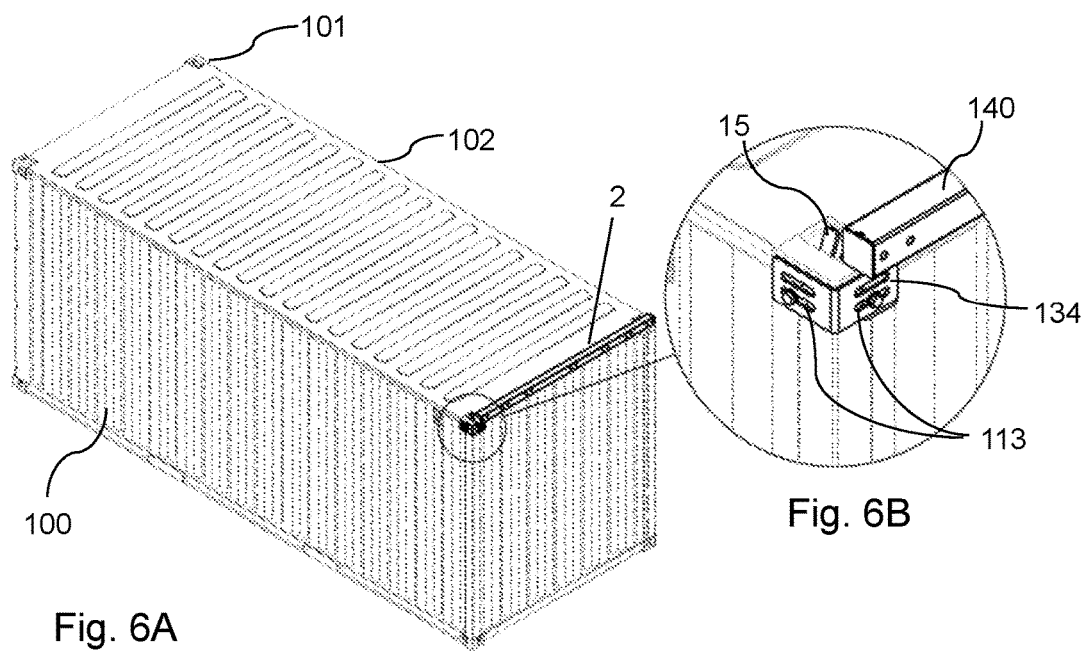
Fig. 6A
Fig. 6B
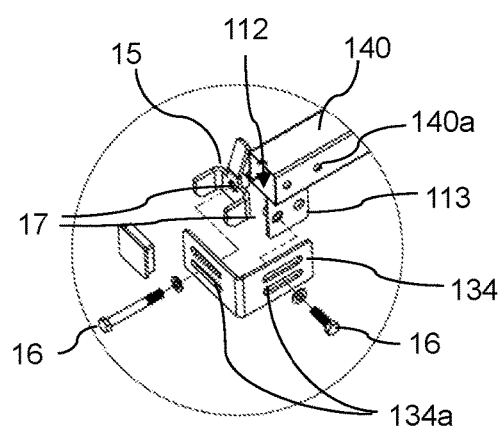
Fig. 6C
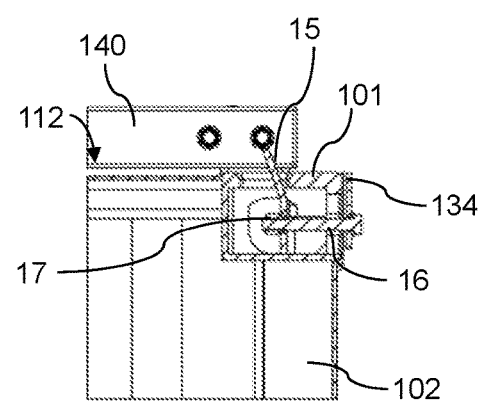
Fig. 6D

ATTACHMENT SYSTEM FOR A TRAINING RIG

TECHNICAL FIELD

The invention considers a modular first and second attachment system for attachment of a training rig to an upper edge of an ISO shipping container in its normal using mode, for example when the container is standing on a floor, on the ground or on another kind of substrate.

BACKGROUND ART

Training rigs for functional training are common at public indoor gyms, companies' private gyms, military training facilities etc. Functional training rigs are rig assemblies normally comprising a number of horizontal crossbars and upright poles connected to each other by brackets to a framework onto which a large number of different training equipment may be mounted. The rig may provide training exercises to develop strength using traditional bodyweight exercises as well as providing support to accessories such as pull-up stations, squat stations, monkey bars, wall bars and other fitness attachments. At this type of facilities, the training rig is mounted to wall or is free standing and normally remains at the same spot in the gym etc. over a longer period (i.e. years).

Another type of training rigs, which normally are used by the military, are shipped to war zones or training camps, to provide functional training possibilities with standard gym equipment in any location around the world. These type of training rigs are normally shipped in one or several standard so-called ISO shipping containers (or cargo/freight container, ISO container, etc.) which are standardized containers with standard dimensions to fit freighters, freight trains and trucks and with a robust frame with specially designed corners fittings which are designed like robust "lifting eye bolts" adapted for twist locks to lock the containers to each other or to the substrate. Further, corrugated walls are arranged to the frame. The dimensions and the corner fittings are standardized on all ISO shipping containers but the design of the corrugated walls may differ depending on the manufacturer. Known training rigs in this segment are sold together with an ISO container which is adopted to the training rig by being equipped with brackets mounted on the container walls by for example bolts or the like, and with an interior especially adopted to transportation of the rig and the gym equipment. It might seem convenient to deliver both a specially adapted container together with the rig and the gym equipment, but the container itself may be useless to other functions at the site, when the rig and the training equipment are assembled to the outside of the container. This, due to that the walls may comprise several holes, screws, bolts, brackets etc. to provide attachment to the sidewalls of the container as well as the interior may be occupied with specially adapted racks etc. for the gym equipment. Such a known training rig is described in US 2016/0175653 which discloses a solution including a container and a plurality of components adapted to fit within the container and where at least some of the components and the container include elements by which the components are adapted to be attached to the outside of the container to provide at least one functional training rig attached to the outside of the container. This solution has a number of drawbacks. First of all it comprises the container itself, which means low flexibility since the container is specially adopted to the rig with a lot of holes in the container walls which limits the use of the container to only training and storage. On top of this, the manufacturer of the training rig also has to buy containers, which need to be prepared and which drives a need of large assembly facilities and assembly locations with reasonable working conditions for the fitters to prepare the containers, which drives the cost. Further, the rig is to be attached to the corrugated walls of the container by means of brackets mounted at the sidewalls, below the robust frame of the container, which means a limited height for example at pull-up exercises when the rig is attached to the container, where the height is too low to most users. Since a lot of holes must be provided in the walls, through which bolts and the like is inserted and mounted, there is a problem with corrosion. This, since there are no galvanized options for the bolted joint. Another drawback is that the number of sections (for pull-ups, squats etc.) are limited since the full length of the container may not be used, due to the dependency of fitting the rig to the corrugated container walls.

SUMMARY OF THE INVENTION

It is an object of the invention to address at least some of the problems and issues outlined above. It is possible to achieve these objects and others by a modular attachment system for attachment of a training rig to an upper edge of an ISO shipping container, as defined in the attached independent claims.

According to an aspect of the invention, a modular first attachment system for attachment of a training rig to an upper edge of an ISO shipping container is disclosed. The first attachment system is adopted for a long side of an ISO shipping container and comprises a first attachment means which comprises an inside corner bracket arrangeable inside a standard corner fitting of an ISO shipping container and an outside corner bracket arrangeable on an outside of a standard corner fitting of an ISO shipping container. The first attachment means further comprises fastening means, wherein the inside corner bracket and the outside corner bracket are connectable to each other by the fastening means, wherein the inside corner bracket is arranged to move in direction towards the outside corner bracket upon operating the fastening means, and wherein the outside corner bracket and inside corner bracket by that are arranged to clamp a part of a corner fitting of an ISO shipping container. The first attachment means further comprises a first receiving part which is fixedly arranged to the outside corner bracket, and the first receiving part is arranged to receive an end of a beam. The first attachment system further comprises a second attachment means which comprises a first part and a second part, each arrangeable on an outside of a frame part of an ISO shipping container, a clamping plate which is arranged to be displaceably attached to the first part of the second attachment means and fastening means. The clamping plate is arranged to move in direction towards the first part of the second attachment means upon operating the fastening means, wherein the clamping plate and the first part of the second attachment means by that are arranged to clamp a frame part of an ISO shipping container. The second attachment means further comprises a second receiving part fixedly arranged to the second attachment means, wherein the second receiving part is arranged to receive at least one end of a beam. The first attachment system further comprises a longitudinal beam, wherein the beam is arranged to be connected to the first receiving part of the first attachment means and to the second receiving part of the second attachment means.

This solution discloses a robust attachment system which is attachable to any standard ISO shipping container and which solution does not affect the container at all which means that no specially designed container must be used. This is a far better solution for the manufacturer of the training rigs since they do not need to buy any containers and they do not need to provide extra space to store containers (which are to be specially designed for the purpose) as in prior art solutions. Further, the first attachment system is arranged higher up (above) the frame of the container, which enables a better functionality of the training rig attached to the system compared to prior art solutions since the available height for exercises is better. Prior art solutions do not provide a use of the full length of the container which is possible by the invention.

According to an embodiment, the outside corner bracket of the first attachment means comprises a first part and a second part, wherein the first part is substantially horizontally arranged and the second part is arranged substantially perpendicularly relative the first part, such as the second part protrudes downwards from the first part relating to a mounted position of the first attachment means on the ISO shipping container.

According to an embodiment, the first part of the outside corner bracket is arranged to be supported by an upside of a corner of a frame of an ISO shipping container. By that, the outside corner bracket transfer forces acting on the bracket to the corner and the frame of the container which provides a robust solution with a well-supported attachment system.

According to an embodiment, the first part of the second attachment means is substantially horizontally arranged and the second part of the second attachment means is arranged substantially perpendicularly relative the first part, such as the second part protrudes downwards from the first part relating to a mounted position of the second attachment means on the ISO shipping container.

According to an embodiment, the first part of the second attachment means is arranged to be supported by at least an upside of a frame of an ISO shipping container. By that, the second attachment means transfer forces acting on the same to the frame of the container which provides a robust solution with a well-supported attachment system.

According to an embodiment, the first and second receiving parts comprise a tubular cross-section. The tube-shape provides high strength and light weight compared to any solid solution. Further, a rectangular tube-shaped is preferred, which provides good guiding when attaching a corresponding tubular beam on the receiving part, such as it is easy to get the beam in correct position such as the holes of the beam faces the rig components or mounting brackets which are to be attached the beam.

According to an embodiment, the first and second receiving parts are arranged to receive an end of a longitudinal beam in a substantially horizontal direction. This means that the receiving parts of the first and second attachment means are arranged in a substantially horizontal direction and the beams extends along the frame of the container.

According to an embodiment, the longitudinal beam comprises a plurality of holes distributed along the longitudinal beam. The holes are arranged to receive for example bolts or other fasteners to provide fixation brackets, monkey bars, beams and other gym equipment which are to be arranged to the first attachment system and to the container. The holes preferably are through holes in both opposite beam walls in the tubular beam and the number of holes and the hole-pattern may vary within the scope of the invention.

According to an embodiment, the first attachment system further comprises two first attachment means, a plurality of second attachment means and a plurality of longitudinal beams. This to cover a complete long side of the container and since the length of different standard ISO shipping containers may vary, the length of the beams and also the length of the first and second attachment means may vary such as to be combined to "fill" the length of the container. The two first attachment means may be one left and one right which may be mirrored and thereby fit a respective opposite corner (left and right) or may be two exact copies fitting any corner of the container.

According to an embodiment of the first attachment system, the inside corner bracket of the first attachment means comprises a thread and second part of the outside corner bracket of the first attachment means comprises a through hole arranged for receiving a bolt. By attaching a bolt through the through hole of the second part of the outside corner bracket and the screw it into the thread of the inside corner bracket, a solid fixation of the first attachment means to the corner fitting of the container is achieved.

According to an embodiment of the first attachment system, the through hole of the second part of the outside corner bracket is elongate in a substantial horizontal direction. When mounting a complete first attachment system to a longside of a container, it is preferred that the second part (the vertical part) of the outside corner bracket of the firstly mounted outside corner bracket (for example the left one when starting to mount the system from the left) comprises a hatch or the like, arranged in the through hole of the second part. This hatch is arranged to fit the eye bolt of the corner fitting and provides a fixed starting point of the first attachment means on the container. The elongate hole of second part of the outside corner bracket provides a more easy way of inserting a bolt into the inside corner bracket when fixing the first attachment means to the corner fitting and also provides tolerance where to fit the final outside corner bracket (for example the right, when started from the left side) to the last corner fitting. Since the beams and the second attachment means along the system are manufactured with tolerances the position of the last outside corner bracket may vary.

According to an embodiment of the first attachment system, the inside corner bracket of the first attachment means comprises a handle and at least one shank, wherein the at least one shank extends a distance along an axis of the thread. Thus, it is easy to insert the inside corner bracket into the corner fitting by having a handle connected to it and the shank/shanks which are attached to a lower part of the handle and extend in direction towards the outside corner bracket, provide support of the inside corner bracket inside the corner fitting.

According to an embodiment of the first attachment system, the first and second receiving parts comprise at least one elongate through hole. This to provide a flexible position of the beam to the receiving part.

According to an embodiment of the first attachment system, the clamping plate of the second attachment means comprises at least one through hole arranged to receive a bolt, and wherein the first part of the second attachment means comprises a thread. This to enable a clamping of the second attachment means to the frame of the container in a simple way.

According to an embodiment of the first attachment system further comprises at least one mounting bracket arranged to be fixedly mounted to the beam and further arranged for supporting at least one training rig component.

By the mounting bracket, any rig component may be attached to the first and second attachment means as well as to the beams. The mounting bracket provides support for any rig component which are to be attached to the system and fits for example beams, monkey bars etc. which are to be perpendicularly arranged relative the first attachment system.

According to an aspect, a modular second attachment system for attachment of a training rig to an upper edge of an ISO shipping container in its normal using mode, is disclosed. The second attachment system is adopted for a short side of an ISO shipping container and the second attachment system comprises two inside corner brackets, each arrangeable inside a standard corner fitting of an ISO shipping container, a longitudinal beam which comprises a bottom and two end plates, wherein the two end plates are arranged substantially perpendicularly relative the bottom and at opposite ends of the longitudinal beam. Thereby the end plates protrude downwards from the bottom relating to a mounted position of the second attachment system on an ISO shipping container. The second attachment system further comprises two outside corner brackets, each arrangeable on an outside of a standard corner fitting of an ISO shipping container and fastening means, wherein each inside corner bracket and respective outside corner bracket are connectable to each other by the fastening means. The inside corner bracket is arranged to move in direction towards the outside corner bracket upon operating the fastening means, wherein the outside corner bracket and inside corner bracket are arranged to clamp a part of a corner fitting of an ISO shipping container. The respective outside corner bracket is further arranged to be attached to the respective end plate of the longitudinal beam by further first fastening means.

This solution discloses a robust attachment system which is attachable to any standard ISO shipping container and which solution does not affect the container at all which means that no specially designed container must be used. All advantages described above regarding the first attachment system and its embodiments are also applicable to this second attachment system and its below described embodiments.

According to an embodiment of the second attachment system, the bottom of the beam is arranged to be supported by an upside of a corner of a frame of an ISO shipping container.

According to an embodiment of the second attachment system, the longitudinal beam comprises a plurality of holes distributed along the longitudinal beam.

According to an embodiment of the second attachment system, the inside corner bracket comprises a thread and the outside corner bracket comprises at least one through hole arranged for receiving a bolt.

According to an embodiment of the second attachment system, the at least one through hole of the outside corner bracket is elongate in a substantial horizontal direction.

According to an embodiment of the second attachment system, the inside corner bracket comprises a handle and at least one shank, wherein the at least one shank extends a distance along an axis of the thread.

According to an embodiment of the second attachment system, the second attachment system further comprises at least one mounting bracket arranged to be fixedly mounted to the beam and further arranged for supporting at least one training rig component.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIG. 5A is a is a view of the first modular attachment system attached to an upper edge of an ISO shipping container according to the invention and FIG. 5B is a view of an almost complete first modular attachment system ready for assembly to the container. FIG. 5C is a zoomed view of one of the second attachment means of FIG. 5B and shows how to attach beams to the second attachment means.

FIG. 5D is a section through a second attachment means mounted to a frame of an ISO shipping container according to the invention and FIG. 5E is a view of the second attachment means mounted to the frame of the container seen slightly from below.

FIG. 6A is a view of a second modular attachment system attached to an upper edge of a gable of an ISO shipping container according to the invention and FIG. 6B is a zoomed view of a corner of the ISO shipping container of FIG. 6A.

FIG. 6C is an exploded view showing a left side of the second attachment system of FIG. 6Aa which is ready to be mounted to a corner fitting of an ISO shipping container and FIG. 6D is a section view of a corner fitting of FIG. 6A with the second attachment system mounted to the corner fitting.

DETAILED DESCRIPTION

Briefly described, a modular first and second attachment system, each arranged for attachment to an upper edge of an ISO shipping container, are disclosed. Since the first and second attachment systems each provide a solution which doesn't impact the ISO shipping container a cost efficient and flexible solution is provided to apply a training rig to any ISO shipping container and the systems further provide better use and more functionality of standard training rig components attached to the systems, since the full length and height of the container may be used.

Figure 1:
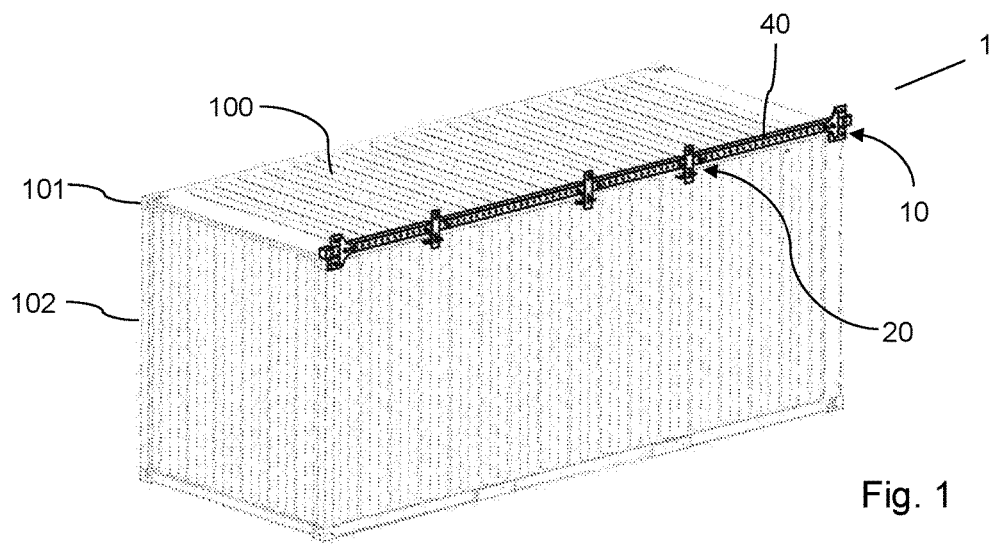
FIG. 1 is a view of a first modular attachment system attached to an upper edge of an ISO shipping container according to the invention.

FIG. 1 shows a first modular attachment system 1 attached to an upper edge of an ISO shipping container 100. By the upper edge is meant along an upper part of a frame of the container 100 referring to a normal using mode of the container 100, such as when standing on a substrate like o floor, the ground or the like. The frame typically comprises eight standard corner fittings 101 between which longitudinal frame parts 102 extends. The first attachment system 1 typically comprise two first attachment means 10 arrangeable to a respective opposite corner 101 of the container 100 (for example the left and the right corners in the figure), number of second attachment means 20, arrangeable to frame parts 102 between the corners 101 of the container 100 and a number of longitudinal beams 40.

Figure 2A:
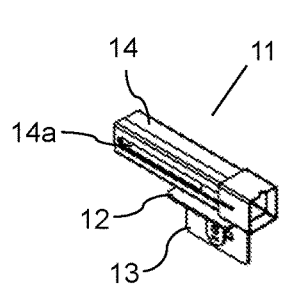
FIGS. 2A-2B are of a left and a right outside corner bracket arrangeable on an outside of a standard corner fitting of an ISO shipping container.
Figure 2B:
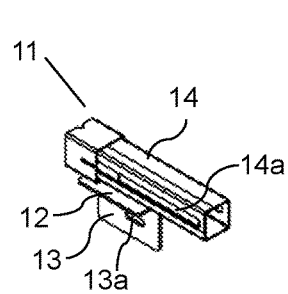

FIGS. 2A-B are views of a left and a right outside corner bracket 11 of the first attachment means 10 of the inventive first attachment system 1, which outside corner brackets 11 are arrangeable on an outside of the standard corner fitting 101 of the ISO shipping container 100. The outside corner bracket 11 comprises a first part 12 and a second part 13, wherein the first part 12 is arranged to be supported by an upside of the corner 101 of the container 100 and therefore is substantially horizontally arranged referring to the normal use of the container 100. The second part 13 is arranged substantially perpendicularly relative the first part 12, such as the second part 13 protrudes downwards from the first part 12 relating to the mounted position of the first attachment means 10 on the ISO shipping container 100. The second part 13 further comprises an, in the horizontal direction elongate, through hole 13a which is arranged for receiving a bolt 16 (see further for example FIG. 3C). The outside corner bracket 11 further comprises a tubular first receiving part 14 which is fixedly arranged to the outside corner bracket 11, preferably on top of the first part 12, and the first receiving part 14 is arranged to receive an end 41, 42 of one beam 40 in a substantially horizontal direction. The first receiving part 14 comprise at least one elongate through hole 14a which is arranged for receiving a bolt 16 when a beam 40 is to be fixedly attached to the receiving part 14 (see further for example FIG. 3D).

Figure 2C:
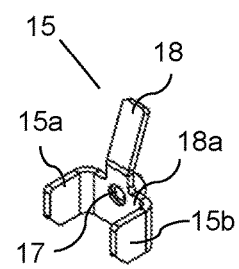
FIG. 2C is a view of an inside corner bracket arrangeable inside a standard corner fitting of an ISO shipping container. One outside corner bracket and one inside corner bracket are parts of a first attachment means.

FIG. 2C is a view of an inside corner bracket 15 arrangeable inside a standard corner fitting 101 of an ISO shipping container 100. The inside corner bracket 15 comprises a handle 18 with a lower plate-like part 18a and two shanks 15a, 15b which protrudes perpendicularly away from the lower part 18a of the handle 18. The handle 18 protrudes upwards in a slight angle from the lower part 18a and the lower part 18a comprises a through hole with a thread 17, arranged for receiving a bolt 17. The shanks 15a, 15b extends a distance along in the same direction as an axis of the thread 17.

Figure 2D:
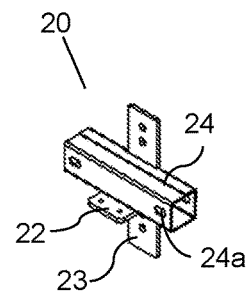
FIG. 2D is a view of a second attachment means arrangeable on a part of a frame of an ISO shipping container i.e. somewhere between two corners of the frame of the ISO shipping container.

FIG. 2D shows a view of a second attachment means 20 of the inventive first attachment system 1, which second attachment means 20 is arrangeable on a frame part 102 of the ISO shipping container 100, i.e. somewhere between two corner fittings 101 of the frame of the ISO shipping container 100. The second attachment means 20 comprises a first part 22 and a second part 23, each arrangeable on an outside of one frame part 102 of the ISO shipping container 100, wherein the first part 22 is arranged to be supported by an upside of the frame part 102 of the container 100 and therefore is substantially horizontally arranged referring to the normal use of the container 100. The second part 23 is arranged substantially perpendicularly relative the first part 22, such as the second part 23 protrudes downwards from the first part 22 relating to the mounted position of the second attachment means 20 on the ISO shipping container 100. The first part 22 further comprises a through hole onto which a threaded nut 27 is arranged, such as a bolt 26 is arrangeable through the hole and to the nut 27 (see further FIG. 5D). The second attachment means 20 further comprises a tubular second receiving part 24 which is fixedly arranged to the second attachment means 20, preferably on top of the first part 22, and the tubular second receiving part 24 is arranged to receive an end 41, 42 of one beam 40 in a substantially horizontal direction from one side (left) and from the opposite side (right). The second receiving part 24 comprise at least one, but preferably two, elongate through holes 24a which are arranged for receiving a respective bolt when a beam 40 is to be fixedly attached to the receiving part 24 (see further FIG. 5C). Preferably the second part 23 of the second attachment means 20 not only protrudes downwards, but also upwards, which may be seen in FIG. 2D. This, to enable fastening of training rig components directly to the second attachment means 20 by that the second part 23 comprises a number of through holes arranged for receiving bolts, to attach rig components.

Figure 2E:
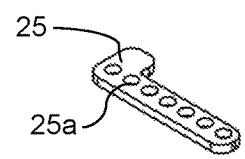
FIG. 2E is a view of a clamping plate which is arranged to be attached to the second attachment means of FIG. 2D
Figure 2F:
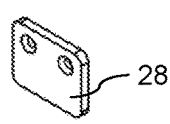
FIG. 2F is a spacer plate for use at the second attachment means.

FIG. 2E is a view of a clamping plate 25 which is arranged to be attached to the second attachment means 20 and FIG. 2F is a spacer plate 28 for use at the second attachment means 20, which will be explained in relation to FIGS. 5A-5E. The clamping plate 25 is arranged to be displaceably attached to the first part 22 of the second attachment means 20 by bolts 26 and therefore it comprises a L-shape and a number of spaced apart through holes 25a along the longer shank of the L. The shorter shank of the L is arranged to clamp an underside of the frame part 102 of the container 100 (see FIG. 5E) and the plurality of through holes 25a provides a flexibility together with the L-shape to fit a number of different corrugation "patterns" of the container walls, since these may differ between different containers 100. The spacer plate 28 is a simple plate with through holes to be arranged between the first part 22 of the second attachment means 20 and the frame part 102 in order to take care of different heights between the top of the corner fitting 101 and the frame part 102 since the ISO standard allows different distances between them.

Figure 2G:
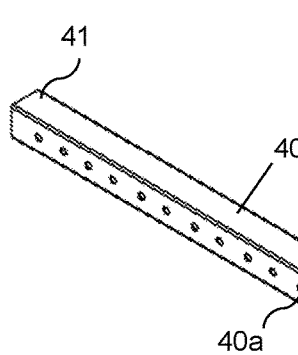
FIG. 2G shows view of two beams according to the invention wherein the two beams have different lengths.
Figure 2G:
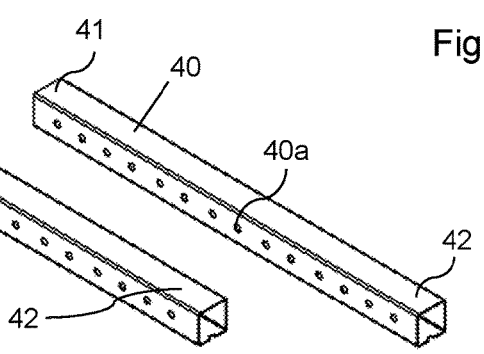

FIG. 2G shows views of two longitudinal beams 40 according to the invention wherein the two beams 40 have different lengths wherein the two beam lengths are adapted to build up the modularity of the first attachment system 1. Thereby, the combination of different lengths of the beams 40 together with the first and second attachment means 10, 20 cover the full length of the ISO shipping container 100. Each beam 40 preferably has tubular cross-section and is arranged to be connected to the first and second receiving parts 14 of the first and second attachment means 10, 20. The longitudinal beam 40 further comprises a plurality of holes 40a distributed along the longitudinal beam 40, which holes 40a are arranged for fastening of brackets 50 arranged for supporting training rig components (see FIG. 3D and FIG. 7).

Figure 3A:
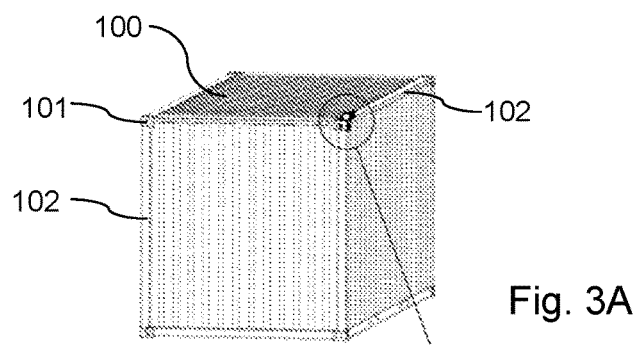
FIG. 3A is a view of an ISO shipping container with a first attachment means attached to a corner fitting of the container and FIG. 3B is a zoomed view of the corner fitting of FIG. 3A.
Figure 3B:
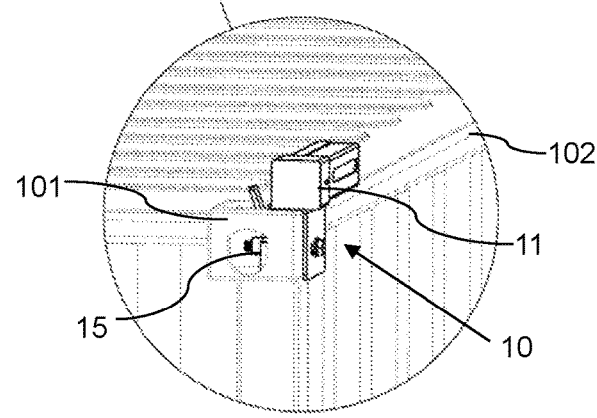
Figure 3C:
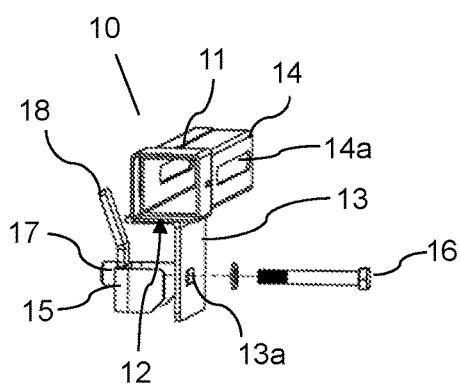
FIG. 3C is an exploded view of the first attachment means according to the invention.

FIG. 3A is a view of an ISO shipping container 100 with the first attachment means 10 attached to one of the corner fittings 101 of the container 100 to prepare the first attachment system 1 to be attached to the frame 102 of the container 100. FIG. 3B is a zoomed view of the corner of FIG. 3A where the inside corner bracket 15 of the first attachment means 10 is arranged inside the standard corner fitting 101 of the ISO shipping container 100 and the outside corner bracket 11 is arranged on an outside of the standard corner fitting 101. To better understand the function and how the different parts are working together FIG. 3C shows an exploded view of the first attachment means 10. Since the corner fittings 101 of all ISO shipping containers are standardized and thus have the same design, both inside the corner fitting 101 which comprise a standardized cavity, and outside which comprise standardized wall thickness etc. which encloses the cavity, the first attachment means 10 fits all standard ISO shipping containers 100. Thus, the inside corner fitting 15 fits inside the cavity of the corner fitting 101 and to introduce the inside corner fitting 15 into the cavity, one grabs the handle 18 and introduce the lower part 18a and the shanks 15a, 15b (for details see FIG. 2C) into the cavity of the corner fitting 101. The outside corner 11 is as told above arranged to fit the outside of the corner fitting 101, by that the first part 12 of the outside corner bracket 11 is arranged to be supported by an upside of the corner 101 of the container 100 and the second part 13 protrudes downwards from the first part 12 and is arranged to abut the vertical outside of the corner fitting 101. When the inside corner bracket 15 is inserted into the cavity of the corner fitting 101 the outside corner bracket 11 is put into position on the outside of the corner fitting 101 and a bolt 16 (or screw) is introduced in the elongate through hole 13a and further inserted into the threaded hole 17 of the inside corner bracket 15. By screwing the bolt 16 inwards, the inside corner bracket 15 moves in direction towards the outside corner bracket 11, a part of the corner fitting 101 is clamped between the shanks 15a, 15b of the inside corner bracket and the second part 13 of the outside corner bracket 11. By that, the first attachment means 10 is robustly fitted to the corner fitting 101 of the container 100 and thus rests on the upside of the frame 102. The solution does not affect the container at all and any standard ISO shipping container may be used and since the first attachment means 10 and the complete first attachment system 1 is arranged higher up (above) the frame 102 of the container 100, a better functionality of the training rig attached to the system 1 is achieved.

Figure 3D:
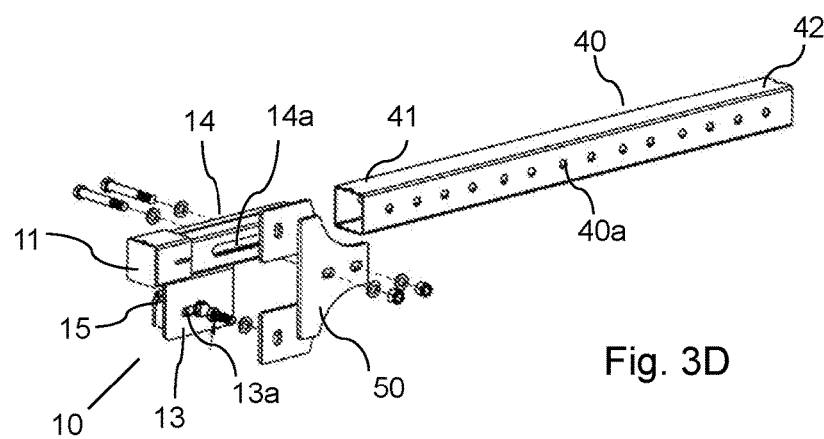
FIG. 3D is an exploded view showing the first attachment means of FIG. 3C, one beam of FIG. 2G and a mounting bracket, which is arranged to be mounted to the beam and which further is arranged to support a training rig component.
Figure 7:
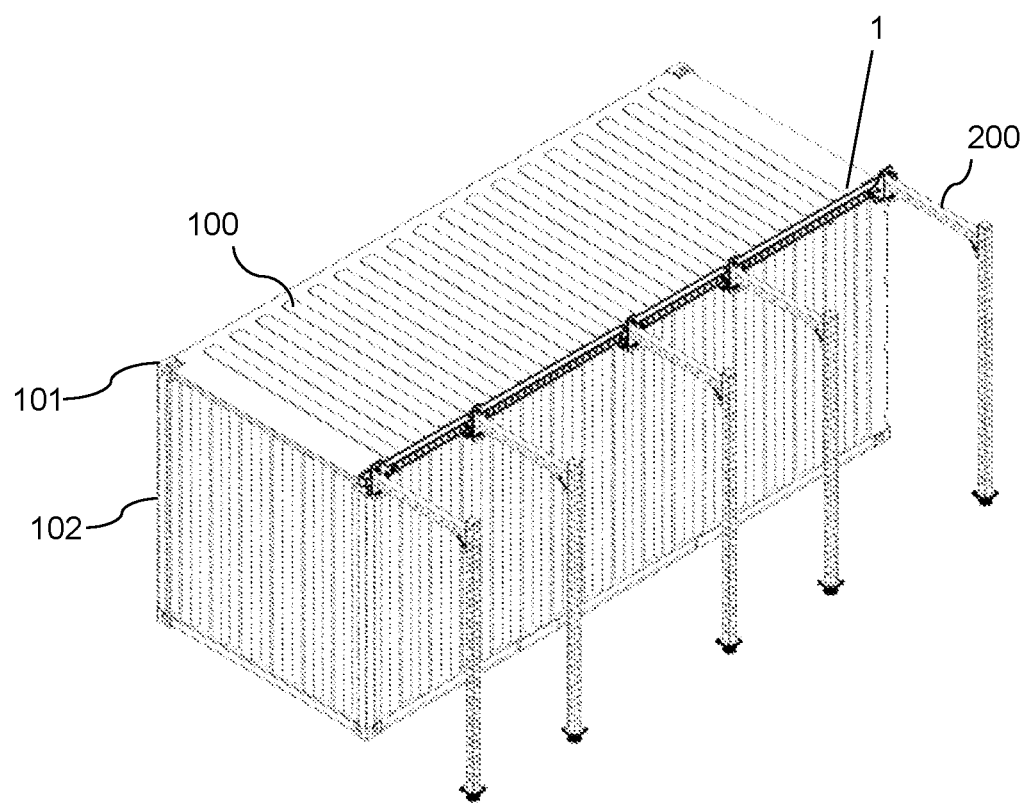
FIG. 7 is a view of a training rig attached to an ISO shipping container by the modular first attachment system according to the invention.
Figure 8:
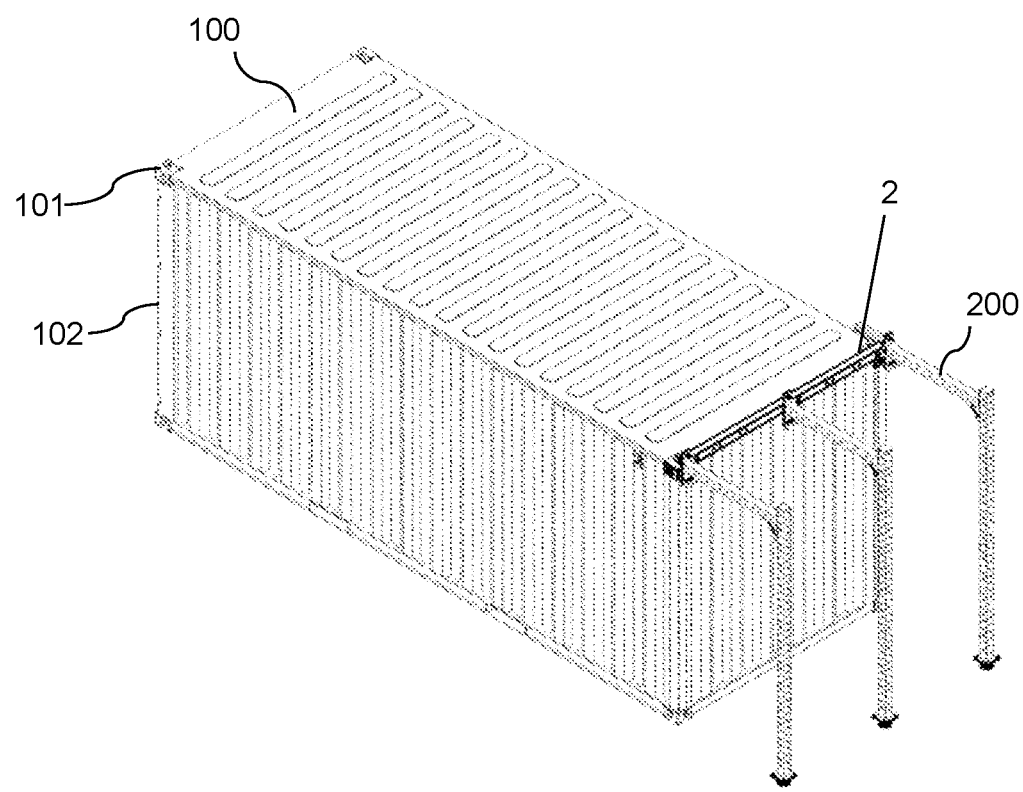
FIG. 8 is a view of a training rig attached to an ISO shipping container by the modular second attachment system according to the invention.

FIG. 3D is an exploded view showing the first attachment means 10, one beam 40 and a mounting bracket 50, which is arranged to be mounted to the beam 40 and which further is arranged to support a training rig component 200 (see FIGS. 7-8). The beam 40 and the receiving part 14 of the outside corner bracket 11 are arranged to be connected by that the beam 40 fits with a first end 41 (or the second end 42) outside the receiving part 14. When the first attachment means 10 is fitted to the corner 101 of the container 100, the beam 40 may be assembled to the first attachment means 10 and preferably, the mounting bracket 50 is at the same time attached to the first attachment means 10 by means of screws/bolts and nuts through the elongate hole 13a of the first part 13 of the outside corner bracket 11. The beam 40 is fixedly attached to the receiving part 14 of the first attachment means 10 and to the mounting bracket 50 by screws/bolts and nuts through holes in the mounting bracket 50, the holes 13a of the beam 40 and through the elongate hole 14a of the receiving part 14.

Figure 4A:
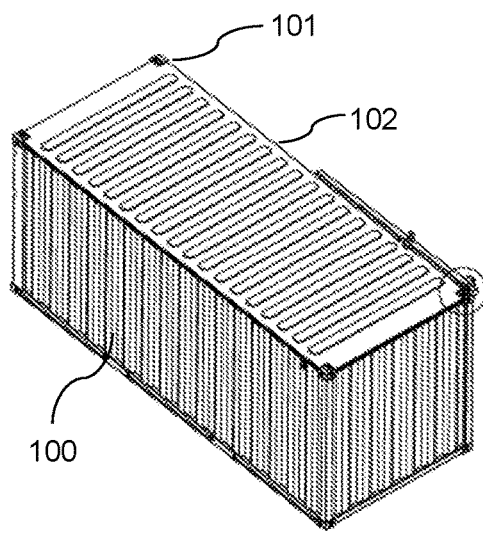
FIG. 4A is a view of an ISO shipping container with a first attachment means and a beam fixedly attached to a corner fitting of an ISO shipping container and FIG. 4B is a zoomed view of the corner fitting of FIG. 4A.
Figure 4B:
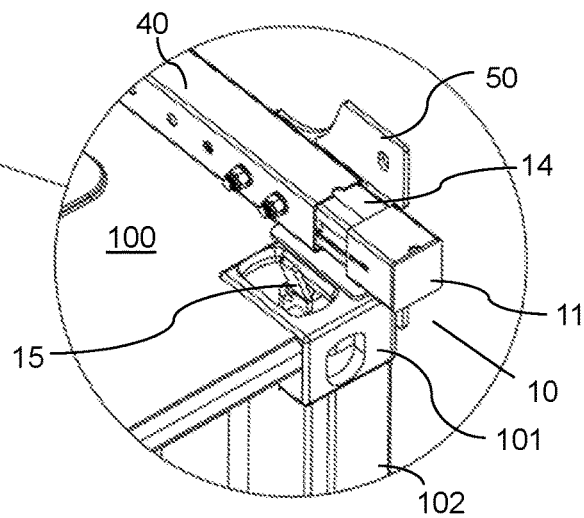

FIG. 4A shows a view from another angle of the ISO shipping container 100 with a first attachment means 10 and a beam 40 is fixedly attached to the corner fitting 101 of the ISO shipping container 100 and FIG. 4b is a zoomed view of the corner fitting 101. In FIG. 4B the inside corner bracket 15 may be seen inside the corner fitting 101 of the container 100, wherein the corner fitting 101 is arranged at an upper edge of the frame 102 of the container 100. On top of the corner fitting 101 and attached to the inside corner bracket 15 by the threaded connection (bolt 16/thread 17) is the outside corner bracket 11 arranged. To the receiving part 14 of the outside corner bracket 11, the beam 40 is attached and at the same joint is also the mounting bracket 50 attached by screws through the mounting bracket, through the holes 13a of the beam 40 and through the elongate hole 14a of the receiving part and connected to nuts on the backside of the beam 40.

Figure 4C:
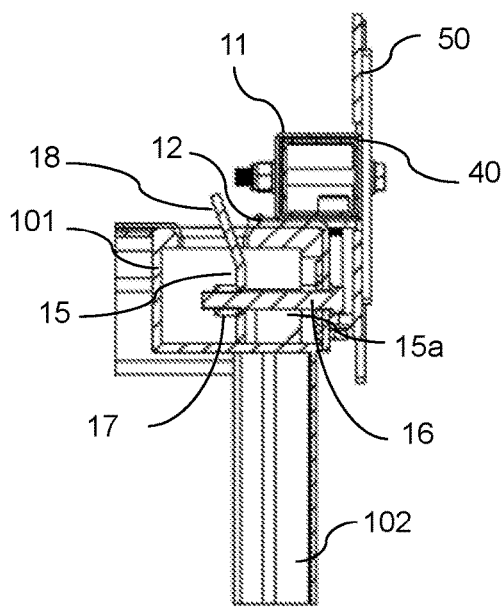
FIG. 4C is a section view of a corner fitting and the attached parts of FIG. 4B.

FIG. 4C shows a section view of a corner fitting 101 and the attached parts of FIG. 4B. The first and second parts 12, 13 of the outside corner bracket 11 is arranged as a right-angled console where the first part 12 rests on the upper side of the corner fitting 101 and the downwardly protruding second part 13 abuts the vertical outside of the corner fitting 101. The shanks 15a, 15b of the inside corner bracket 15 abuts an inside of the cavity of the corner fitting 101 since the bolt 1 is screwed into the thread 17 and tightened such as the complete first attachment means 10 is fixedly attached to the corner fitting 101. The beam 40 and the mounting bracket 50 is fixedly attached to the outside corner bracket 11 as mentioned above.

FIG. 5A shows a view of the first modular attachment system 1 attached to an upper edge (corner 101 and frame 102) of an ISO shipping container 100, according to the invention and FIG. 5B shows a view of an almost complete first modular attachment system 1 ready for assembly to the container 100, where a plurality of beams 40, second attachment means 20 and one (the left) first attachment means 10 are mounted or to be mounted together. In the figure, one (the right) first attachment means 10 is missing. FIG. 5C shows a zoomed view of one of the second attachment means 20 of FIG. 5B and shows how to attach the beams 40 to the second attachment means 20. Further, FIG. 5D shows a section through the second attachment means 20 when mounted to the frame 102 of the ISO shipping container 100 and FIG. 5E shows a view of the second attachment means 20 mounted to the frame 102 seen slightly from below.

The second attachment means 20 is as told above arrangeable on the frame part 102 of the ISO shipping container 100, i.e. somewhere between two corner fittings 101 in a position at/near one end 41, 42 of the beam 40, such as a beam 40 is properly fitted between the first attachment means 10 and the second attachment means 20. The first part 22 of the second attachment means 20 is to be arranged on an upper side of the frame part 102 and the second part 23 is arranged perpendicularly relative the first part 22, thus protruding downwards from the first part 22. Preferably the second part 23 of the second attachment means 20 not only protrudes downwards, but also upwards, which may be seen in FIG. 5C. This, to enable fastening of training rig components directly to the second attachment means 20 by that the second part 23 comprises a number of through holes arranged for receiving bolts, to attach rig components 200 (see FIG. 7). The second attachment means 20 comprises the tubular second receiving part 24 which is fixedly arranged to the second attachment means 20, on top of the first part 22, and the tubular second receiving part 24 is arranged to receive the end 41, 42 of one beam 40 in a substantially horizontal direction from one side (left) and from the opposite side (right), as can be seen in FIG. 5C. The elongate through holes 24*a* of the second receiving part 24 are arranged for receiving a respective bolt when the beam 40 is to be fixedly attached to the receiving part 24. The first part 22 of the second attachment means 20 further comprises at least one, but more preferred two, through holes (not visible) and also the second receiving part 24 comprises corresponding through holes onto which a respective threaded nut 27 is arranged, such as a bolt 26 is arrangeable through the respective hole and to the nut 27 (see FIG. 5D).

As may be seen in FIG. 5C one or more spacer plates 28 (see also FIG. 2F) may be arranged between the frame part 102 and the first part 22 of the second attachment means 20 in order to take care of different heights between the top of the corner fitting 101 and the frame part 102 since the ISO standard allows different distances between them. Further, in FIGS. 5C-5E, a clamping plate 25 (see also FIG. 2E) is arranged to be displaceably attached to the first part 22 of the second attachment means 20 by bolts 26 and therefore it comprises a L-shape and a number of spaced apart through holes 25*a* along the longer shank of the L, as explained in relation to FIG. 2E. The shorter shank of the L is arranged to clamp an underside of the frame part 102 of the container 100 (see FIGS. 5D-5E) and the plurality of through holes 25*a* provides a flexibility together with the L-shape to fit a number of different corrugation "patterns" of the container walls, since these may differ between different containers 100. By tensioning the bolts 26, the frame part 102 of the container 100 is clamped between the first part 22 of the second attachment means 20 and the clamping plate 25, and a robust fixation of the second attachment means 20 is achieved.

FIG. 6A shows a view of a second modular attachment system 2, which is attached to an upper edge of a gable of an ISO shipping container 100 and FIG. 6B is a zoomed view of a corner fitting 101 of the ISO shipping container 100 of FIG. 6A. The second modular attachment system 2 is a bit different compared to the first modular attachment system 1 because it is designed to be used together with the first modular attachment system 1 and use a shared corner. As can be seen in FIG. 6B, an exactly the same type of inner corner bracket 15 as used in the first modular attachment system 1, is arranged inside the cavity of the corner fitting 101 in the same way as if a first modular attachment system 1 would be mounted to the same corner fitting 101, i.e. the inside corner bracket 15 facing the long side of the container 100. A longitudinal beam 140 is arranged on top of the corner fitting 101 in the same way and with a, from a bottom 112 of the beam 140, downwardly protruding end plate 113 (see further FIGS. 6C-6D) arranged at each end of the beam 140, which end plate 113 is arranged to abut an outside of the corner fitting 101. The longitudinal beam 140 comprises a plurality of holes 140*a* distributed along the longitudinal beam, preferably arranged in pairs, and arranged for mounting brackets 50 in the same way as in the first attachment system 1. Outside the end plate 113 and on the outside of the corner fitting 101 is an outside corner bracket 134 arranged, which is arranged as an angle bracket enclosing the corner fitting 101 on the outside and which comprises two elongate holes 134*a* arranged along each shank of the outside corner bracket 134 in a substantial horizontal direction.

FIG. 6C shows an exploded view of the left side of the second attachment system 2 of FIGS. 6A-6B, which is ready to be mounted to the corner fitting 101 and FIG. 6D is a section view of the corner fitting of FIG. 6A with the second attachment system 2 mounted to the corner fitting 101. The second attachment system 2 comprises one longitudinal beam 140 with a fixed length which covers the complete length of the gable of the ISO shipping container 100. This is enough since all such containers have the same width. This is also why the beam 140 may have a special design only to fit the gable, with one fixedly arranged end plate 113 at each end of the beam 140. Each end plate 113 comprises at least one but more preferred, two through holes wherein at least one of them have a tread 17 or a threaded nut 17 arranged on the back side, which may be seen in FIGS. 6C-6D. The second attachment system 2 comprises two outside corner brackets 134, one at each corner fitting 101 (left and right).

The second attachment system 2 is mounted to the container 100 by that the respective outside corner bracket 134 is screwed to the respective end plate 113 of the longitudinal beam 140 by screwing a bolt 16 through the elongate through holes 134*a* of the outside corner bracket 134 and further to the threaded nut 17 arranged on the back side of the end plate 113 to fix the beam 140 to the outside corner bracket 134. Then, the outside corner bracket 134 is connected to the inside corner bracket 15 by screwing a bolt 16 through the elongate through hole 134*a* of the outside corner bracket 134 and further to the thread of the inside corner bracket 15, such as the latte moves in direction towards the outside corner bracket 134, wherein the outside corner bracket 134 and inside corner bracket 15 clamps a part of a corner fitting 101 of the ISO shipping container 100 as can be seen in FIG. 6B and FIG. 6D. The beam 140 is then fixedly attached to the corner fitting 101 in a similar way as in the first attachment system 1, wherein the bottom 112 of the beam 140 rests on an upside of the corner fitting 101, wherein the beam 140 is arranged above the horizontal frame part 102 of the container 100. The second attachment system is then ready for use by attaching mounting brackets 50 to the holes 140*a* of the beam 140 in wanted positions along the beam 140 for support of training rig components 200 (see further FIG. 8).

FIG. 7 is a view of a training rig with training rig components 200 attached to an ISO shipping container 100 by the modular first attachment system 1 according to the invention. The training rig components 200 may be beams, bars, poles etc. which are standard components used at stationary gyms and the like and where some of the rig components 200 are arranged to fit to the mounting brackets 50 which are described above. As may be seen in the figure, the full length of the ISO shipping container 100 may be used and the training rig has a better height above the ground since the system is arranged on top of/above the horizontal frame parts 102 of the container, which is far better than existing training rigs for shipping and transport to different sites. Further, any standard ISO Shipping container may be used, not only the one for transporting the training rig as in prior art, but any container since it is totally unaffected by the system. The two different length of the beams 40 of the first attachment system 1 may be combined to fit the most lengths of ISO shipping containers on the market.

FIG. 8 is a view of a training rig with training rig components 200 attached to an ISO shipping container 100 by the modular second attachment system 2 according to the invention. The second attachment system 2 has the same benefits as the first attachment system 1 and the two systems may be used together since they do not interfere each other at the corners of the container.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein and are intended to be encompassed hereby.

The invention claimed is:

1. A modular first attachment system for attachment of a training rig to an upper edge of an ISO shipping container in its normal using mode, the first attachment system comprising:
   a first attachment means which comprises:
      an inside corner bracket arrangeable inside a standard corner fitting of the ISO shipping container,
      an outside corner bracket arrangeable on an outside of the standard corner fitting of the ISO shipping container,
      a first fastening means, wherein the inside corner bracket and the outside corner bracket are connectable to each other by the first fastening means, wherein the inside corner bracket is arranged to move in a direction towards the outside corner bracket upon operating the first fastening means, wherein the outside corner bracket and inside corner bracket are arranged to clamp a part of the standard corner fitting of the ISO shipping container,
      a first receiving part fixedly arranged to the outside corner bracket, wherein the first receiving part is arranged to receive an end of a longitudinal beam,
   a second attachment means which comprises:
      a first part and a second part, each arrangeable on an outside of a frame part of the ISO shipping container,
      a clamping plate which is arranged to be displaceably attached to the first part of the second attachment means,
      a second fastening means, wherein the clamping plate is arranged to move in direction towards the first part of the second attachment means upon operating the second fastening means, wherein the clamping plate and the first part of the second attachment means are arranged to clamp the frame part of the ISO shipping container,
      a second receiving part fixedly arranged to the second attachment means, wherein the second receiving part is arranged to receive at least one end of the longitudinal beam,
   the longitudinal beam, wherein the longitudinal beam is arranged to be connected to the first receiving part of the first attachment means and to the second receiving part of the second attachment means.

2. The modular first attachment system according to claim 1, wherein the outside corner bracket of the first attachment means comprises a first part and a second part, wherein the first part is substantially horizontally arranged and the second part is arranged substantially perpendicularly relative the first part, such that the second part protrudes downwards from the first part relating to a mounted position of the first attachment means on the ISO shipping container.

3. The modular first attachment system according to claim 2, wherein the first part of the outside corner bracket is arranged to be supported by an upside of a corner of the frame of the ISO shipping container.

4. The modular first attachment system according to claim 1, wherein the first part of the second attachment means is substantially horizontally arranged and the second part of the second attachment means is arranged substantially perpendicularly relative the first part, such that the second part protrudes downwards from the first part relating to a mounted position of the second attachment means on the ISO shipping container.

5. The modular first attachment system according to claim 4, wherein the first part of the second attachment means is arranged to be supported by at least an upside of the frame of the ISO shipping container.

6. The modular first attachment system according to claim 1, wherein the first and second receiving parts comprise a tubular cross-section.

7. The modular first attachment system according to claim 1, wherein the first and second receiving parts are each arranged to receive the respective end of the longitudinal beam in a substantially horizontal direction.

8. The modular first attachment system according to claim 1, wherein the longitudinal beam comprises a plurality of holes distributed along the longitudinal beam.

9. The modular first attachment system according to claim 1, wherein the system further comprising two first attachment means, a plurality of second attachment means and a plurality of longitudinal beams.

10. The modular first attachment system according to claim 1, wherein the inside corner bracket of the first attachment means comprises a thread and second part of the outside corner bracket of the first attachment means comprises a through hole arranged for receiving a bolt.

11. The modular first attachment system according to claim 10, wherein the through hole of the second part of the outside corner bracket is elongate in a substantial horizontal direction.

12. The modular first attachment system according to claim 10, wherein the inside corner bracket of the first attachment means comprises a handle and at least one shank, wherein the at least one shank extends a distance along an axis of the thread.

13. The modular first attachment system according to claim 1, wherein the first and second receiving parts comprise at least one elongate through hole.

14. The modular first attachment system according to claim 1, wherein the clamping plate of the second attachment means comprises at least one through hole arranged to receive a bolt, and wherein the first part of the second attachment means comprises a thread.

15. The modular first attachment system according to claim 1, further comprising at least one mounting bracket arranged to be fixedly mounted to the longitudinal beam and further arranged for supporting at least one training rig component.

16. A modular second attachment system for attachment of a training rig to an upper edge of an ISO shipping container in its normal using mode, the second attachment system comprising:
   two inside corner brackets, each arrangeable inside a standard corner fitting of the ISO shipping container, a longitudinal beam which comprises a bottom and two end plates, wherein the two end plates are arranged substantially perpendicularly relative the bottom and at opposite ends of the longitudinal beam, such that the two end plates protrude downwards from the bottom relating to a mounted position of the second attachment system on the ISO shipping container, two outside corner brackets, each arrangeable on an outside of the standard corner fitting of the ISO shipping container, fastening means, wherein each said inside corner bracket and respective outside corner bracket are connectable to each other by the fastening means, wherein the inside corner bracket is arranged to move in a direction towards the outside corner bracket upon operating the fastening means, wherein the outside corner bracket and inside corner bracket are arranged to clamp a part of the standard corner fitting of the ISO shipping container, and wherein the respective outside corner bracket further is arranged to be attached to the respective end plate of the longitudinal beam by a further fastening means.

17. The modular second attachment system according to claim 16, wherein the bottom of the longitudinal beam is arranged to be supported by an upside of a corner of a frame of the ISO shipping container.

18. The modular second attachment system according to claim 16, wherein the longitudinal beam comprises a plurality of holes distributed along the longitudinal beam.

19. The modular second attachment system according to claim 16, wherein the inside corner bracket comprises a thread and the outside corner bracket comprises at least one through hole arranged for receiving a bolt.

20. The modular second attachment system according to claim 19, wherein the at least one through hole of the outside corner bracket is elongate in a substantial horizontal direction.

21. The modular second attachment system according to claim 19, wherein the inside corner bracket comprises a handle and at least one shank, wherein the at least one shank extends a distance along an axis of the thread.

22. The modular second attachment system according to claim 16, further comprising at least one mounting bracket arranged to be fixedly mounted to the longitudinal beam and further arranged for supporting at least one training rig component.

* * * * *